United States Patent Office 3,239,421
Patented Mar. 8, 1966

3,239,421
PERFUME COMPOSITION CONTAINING 2-(BETA-PHENYLETHOXY)-4,4,6-TRIMETHYL-1,3-DIOXA-2-BORINANE
Irving S. Bengelsdorf, Santa Ana, Calif., assignor to United States Borax & Chemical Corporation, Los Angeles, Calif., a corporation of Nevada
No Drawing. Filed Sept. 29, 1964, Ser. No. 400,253
1 Claim. (Cl. 167—94)

This application is a continuation-in-part of my co-pending application Serial No. 211,881 filed July 23, 1962 which is now abandoned.

This invention relates to a novel $\beta$-phenylethyl alkylene glycol borate and methods for using said compound.

It is, therefore, the principal object of this invention to provide as a new compound a $\beta$-phenylethyl alkylene glycol borate.

It is a further object of this invention to provide perfume compositions containing said novel borate.

Other objects of the present invention will appear as the description proceeds.

To the accomplishment of the foregoing and related ends, said invention then comprises the features hereinafter fully described and particularly pointed out in the claim, the following description setting forth in detail certain illustrative embodiments of the invention, these being indicative, however, of but a few of the various ways in which the principle of the invention may be employed.

There is provided by this invention 2-($\beta$-phenylethoxy)-4,4,6-trimethyl-1,3-dioxa-2-borinane having the formula

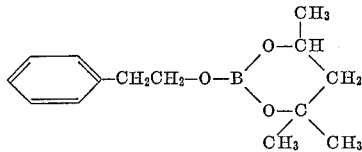

which is useful as a constituent of perfume formulations, herbicide compositions, and as an additive for fuel for internal combustion engines.

The novel borate is readily prepared by reaction of $\beta$-phenylethanol with the hexylene glycol monoborate (2-hydroxy-4,4,6-trimethyl-1,3-dioxa-2-borinane) or a lower alkoxy derivative of the glycol monoborate, as illustrated by the equation

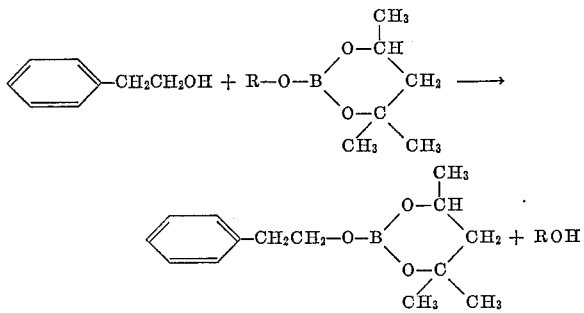

wherein R is hydrogen or a lower alkyl group having, for example, 1 to about 4 carbon atoms. The glycol monoborate reactant is well known to the art and is readily available.

The reaction takes place at elevated temperatures in a relatively short time. For example, at a preferred reaction temperature of about 50° C. to about 125° C., a good yield of the desired product is obtained in about 2 to 4 hours. The progress of the reaction is easily followed by the formation of the by-product water or lower alkanol. Preferably, a hydrocarbon solvent is used as a reaction medium so as to maintain close control of the reaction temperature and facilitate removal of the by-products as they are formed as, for example, by azetropic distillation. The desired product is isolated and purified by conventional procedures well known to those skilled in the art.

Alternatively, the compound can be prepared by the reaction of $\beta$-phenylethanol, boric acid and the corresponding glycol in a direct single-step process as set forth in my copending application with William G. Woods, Serial No. 106,527, filed May 1, 1961.

The following example illustrates the preparation of the compound of this invention:

A solution of 61.08 grams (0.5 mole) of $\beta$-phenylethanol and 72.0 grams (0.5 mole) of hexylene glycol monoborate in 175 ml. of cyclohexane was stirred in a 500 ml. flask at reflux temperature. The by-product water was removed as it was formed by means of a Dean-Stark trap. Refluxing was continued until the theoretical amount of water had been taken off (about 4 hours). The cyclohexane was removed by distillation under reduced pressure to give 123.3 grams of crude product as an oily residue. The crude product was distilled under reduced pressure and 2-($\beta$-phenylethoxy)-4,4,6-trimethyl-1,3-dioxa-2-borinane collected at 99° C./0.2 mm. $n_D^{25}$ 1.4845.

Calculated for $C_{14}H_{21}BO_3$:
  B=4.37%
  C=67.8%
  H=8.53%

Found in product:
  B=4.46%
  C=66.9%
  H=8.4%

The novel compound of this invention is an oily liquid having a very pleasant, sweet, rose-like odor, which is useful as a constituent of perfume formulations. It can be incorporated in perfume formulations according to methods well known to the perfume art. For example, the compound is added, in a small amount sufficient to modify the odor, to perfume compositions, the major amount of which comprises a perfume carrier such as ethyl alcohol. Other known perfume composition components or diluents, such as diethyl phthalate, can also be included. The compound also exhibits herbicidal activity when applied to growing plants.

Other modes of applying the principle of the invention may be employed, change being made as regards the details described, provided the features stated in the following claim or the equivalent of such be employed.

I, therefore, particularly point out and distinctly claim as my invention:

A perfume composition comprising 2-($\beta$-phenylethoxy)4,4,6-trimethyl-1,3-dioxa-2-borinane in an amount sufficient to modify the odor of said composition and a major amount of a perfume carrier.

References Cited by the Examiner
UNITED STATES PATENTS
3,104,255  9/1963  Emrick et al. _____ 260—462

JULIAN S. LEVITT, *Primary Examiner.*
VERA C. CLARKE, *Assistant Examiner.*